April 15, 1958
W. J. MITCHELL
2,830,618
HAND-AND FOOT-OPERATED SINK AND LAVATORY FAUCET FIXTURE
Filed Dec. 10, 1954
2 Sheets-Sheet 2
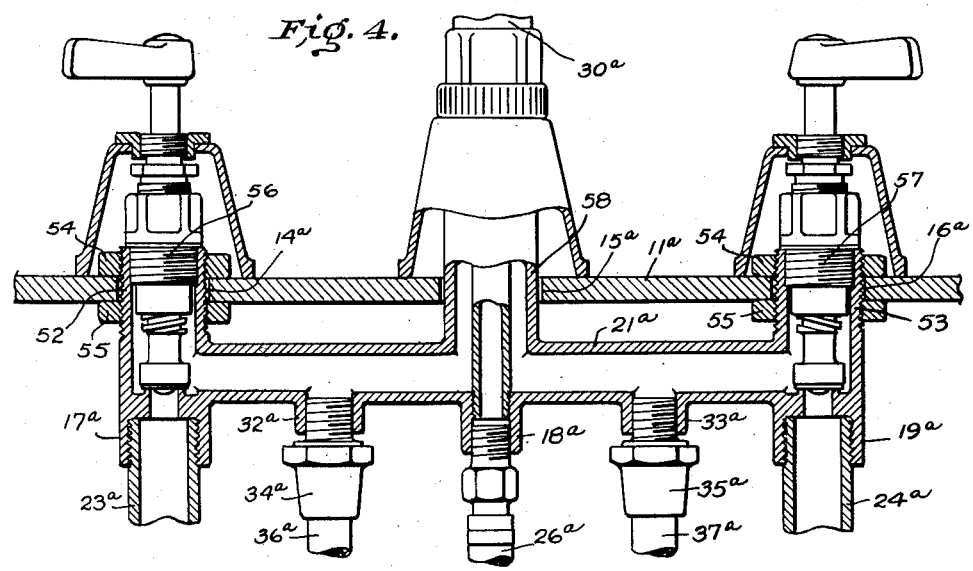
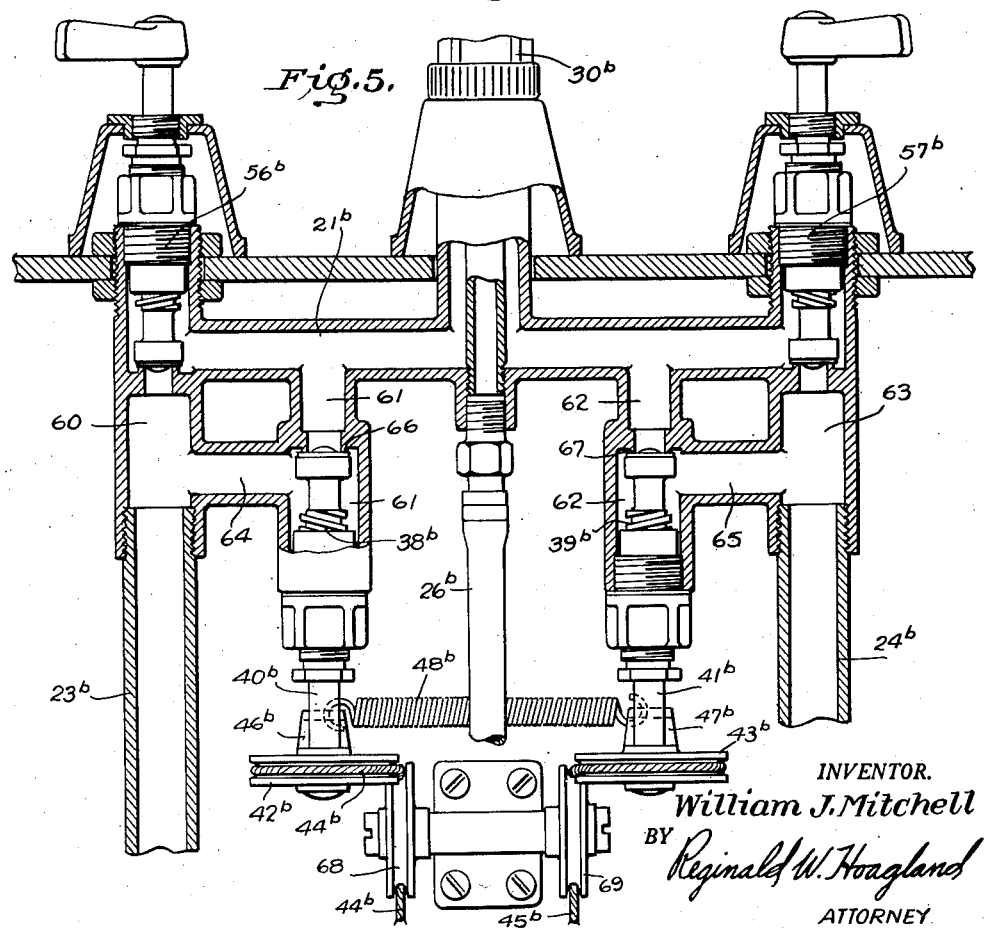
INVENTOR.
William J. Mitchell
BY
Reginald W. Hoagland
ATTORNEY

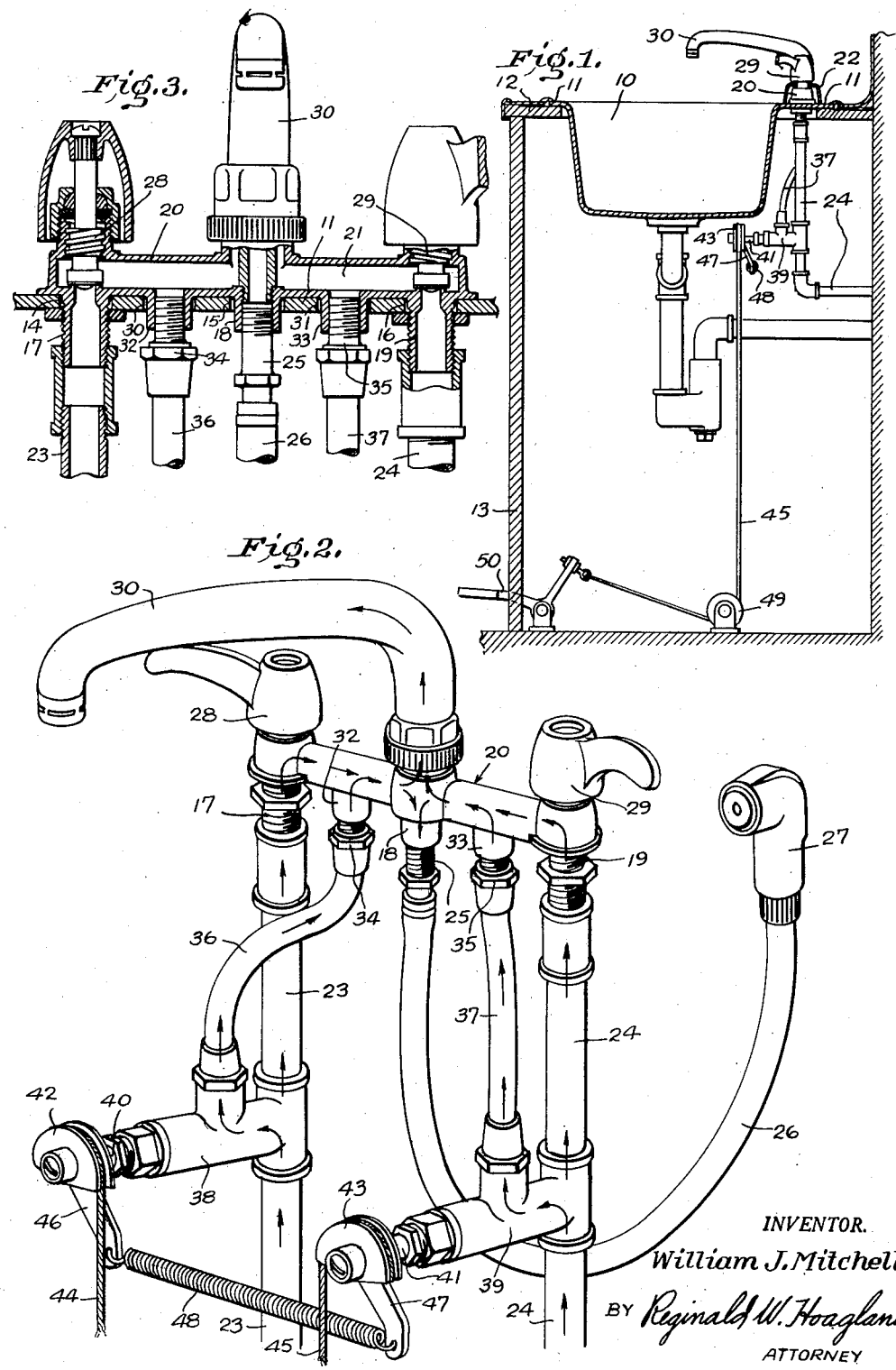

United States Patent Office 2,830,618
Patented Apr. 15, 1958

2,830,618

HAND- AND FOOT-OPERATED SINK AND LAVATORY FAUCET FIXTURE

William J. Mitchell, Mount Morris, Mich.

Application December 10, 1954, Serial No. 474,471

2 Claims. (Cl. 137—599)

The present invention relates to faucet fixtures of kitchen sinks, lavatory basins, laundry tubs, and the like having both hand- and foot-operated valves for controlling the flow of both hot and cold water from faucets.

An object of the invention is to provide a water supply fixture wherein either hand-operated valves or pedal-operated valves admit and shut off the flow of hot and cold water to a mixing faucet independent of one another, thus retaining all the advantages of hand operation and permitting foot operation by a person when his hands are otherwise occupied.

I am aware that attempts have been made to accomplish a similar result by attaching to the handles of normally hand-operated valves various arrangements of links, levers, and cables that extend downwardly to pedals for foot operation. Structures of such character, because of their unsightly appearance, usually require that the hand-operated valves be placed under the sinks or lavatories where it is inconvenient to reach them for hand operation, and if placed at their customary locations, the connecting structures to their handles interfere with hand operation, with other chores conducted at sinks and lavatories, and with efficient and sanitary cleaning around same.

Another object of the invention is to provide, in addition to a customary hot and cold water mixing faucet having a single discharge nozzle and separate hot and cold water hand-operated valves, a pair of pedal-operated valves, one being connected to the hot water supply pipe and the other to the cold water supply pipe and both by-passing the hand-operated hot and cold water valves of the faucet and being connected to the faucet at its mixing chamber.

A further object of the invention is to provide, in a fixture of the above character, a pair of foot-operated valves constructed and associated relative to one another in such a manner that a single spring attached to arms on both valves yieldably closes said valves, while foot-operated structures open said valves independent of one another against tension of said closure spring.

A further object of the invention is to provide, in a fixture of the character set forth, a faucet having a water mixing manifold with pipe connections to the interior thereof for a pair of hot water supply pipes and a pair of cold water supply pipes.

A still further object of the invention is to provide, in a fixture of the above character, a faucet having a water mixing manifold with pipe connections for a single hot water supply pipe and a single cold water supply pipe and having passages therein whereby either of a pair of hot water valves can be operated to by-pass the other in the supply of hot water through the manifold, said manifold also having other passages therein whereby either of a pair of hot water valves can be operated to by-pass the other in the supply of cold water through the manifold.

It is also an object of the invention to provide a fixture of the character indicated above which is simple and substantial in construction, easily accessible for assembly and replacement of parts, inexpensive to manufacture, and yet effective and efficient in use.

Other and further objects of the invention will become apparent from a reading of the following specification taken in conjunction with the drawings, in which:

Figure 1 is a vertical section through a kitchen sink and supporting cabinet therefor, showing the improved fixture in side elevation;

Figure 2 is a perspective view of the improved fixture;

Figure 3 is a vertical longitudinal section showing the improvements applied to a type of mixing manifold that rests upon a sink flange, and showing some parts in elevation;

Figure 4 is a view similar to Figure 3, showing the improvements applied to a type of mixing manifold supported beneath a sink flange; and Figure 5 is also a similar sectional view showing a modified form of the invention wherein all valve housings and valve seats are part of the construction of the mixing manifold.

Referring now more specifically to the accompanying drawings wherein like numerals designate similar parts throughout the various views, there is indicated by the numeral 10 in Figure 1, a sink having the usual flange 11 extending therearound which rests upon and is watertight-sealed to a table top 12 of a sink-supporting cabinet 13. The flange 11 at the rear of the sink normally is provided with three holes 14, 15, and 16 therein through which extend depending nipples 17, 18, and 19, respectively, on a mixing faucet 20, shown in Figures 1, 2, and 3. The faucet 20 is of a type in which the mixing manifold 21 thereof is located above the sink flange 11 and said manifold is enclosed by a hood 22 clamped by said faucet in engagement with said flange. Threaded upon the end nipples 17 and 19 are the usual pipe couplings which in turn are connected to the hot and cold water supply pipes 23 and 24, respectively, while threadably connected into the center nipple 18 is a fitting 25 to which a hose 26 with a spray nozzle 27 thereon is attached.

Mounted on the upper wall of the mixing manifold 21 directly above the nipples 17 and 19 are hand-operated valves 28 and 29 with the seats therefor at locations where the openings through the nipples communicate with the mixing chamber for controlling the entrance of hot and cold water into the mixing manifold. Also mounted on the upper wall of the mixing chamber and directly above the central nipple 25 is a swing spout 30 with the usual construction (not shown) and connection to the opening in the nipple 25 for closing off the flow of water to the spout 30 during operation of the spray nozzle 27.

The improved construction forming the subject of the present invention includes the provision of two additional openings 30 and 31 through the flange or ledge 11 of the sink 10 at locations approximately midway between the openings 17 and 18 and openings 18 and 19, respectively, for permitting internally threaded nipples 32 and 33 communicating with the mixing chamber to extend downwardly through said flange or ledge. Threaded in the nipples 32 and 33 are ends of couplings 34 and 35 to which are attached the upper ends of pliable copper pipes 36 and 37. The pipes 36 and 37 extend downwardly in rear of the sink 10 to locations slightly below the sink where they are connected to foot-operated valves 38 and 39, respectively, which are provided with T branches that connect onto the hot and cold water supply pipes 23 and 24 tapping water from said supply pipes.

The valves 38 and 39 are at the same elevation and are in spaced parallel relation to one another with the stems or spindles 40 and 41 thereof projecting forwardly under the sink for convenient access thereto. Instead of having handles on the spindles 40 and 41, segments of pulleys 42 and 43 are provided over which the upper end portions of cables 44 and 45 are entrained prior to connections with said segments. The valves 38 and 39 are of different construction in that they are turned in opposite directions to open and close (not shown). Extending downwardly from the pulley segments 40 and 41 are arms 46 and 47, respectively, to which are attached the opposite ends of a contractile spiral spring 48 for closing and yieldably holding closed the valves 38 and 39 upon the lack of tension on the cables 44 and 45.

Below the pulley segments 42 and 43 and supported on the floor of the cabinet are pulleys 49 (one shown) under which are entrained the cables prior to their attachment to foot pedal mechanisms 50 (one shown) also supported on the floor and projecting outward of the cabinet 13.

With the above-described construction, the opening of either a hand-operated valve or a foot-operated valve that is supplied with water from the same line permits the flow of water to by-pass the other of said valves in said line and to enter the common mixing chamber. Therefore, should the hands of a person be otherwise occupied, water may be dispensed from the spout 30 by operation of either or both foot pedals 50 according to the desired temperature of the water. Further, should either or both hand-operated valves be open and a change of temperature in the water is momentarily desired, such can be accomplished by a short operation of proper foot valve (hot or cold) without disturbing the temperature adjustment of the hand valves.

Referring now to the form of the invention illustrated in Figure 4, there is shown a type of mixing faucet having the mixing manifold $21^a$ thereof supported beneath a flange or ledge $11^a$ of a sink by having upstanding tubular projections 52 and 53 on said manifold clamped to said flange. The tubular projections 52 and 53, which are located at opposite ends of the manifold $21^a$, extend upwardly through openings $14^a$ and $16^a$ in the flange $11^a$ and have threaded thereon nuts 54 and 55 that bear against opposite sides of said flange. Threadably supported in the tubular projections 52 and 53 and extending above the flange $11^a$ are hand-operated valve structures 56 and 57, respectively, that engage valve seats at locations where openings in depending nipples $17^a$ and $19^a$ communicate with the interior of the manifold $21^a$. To the depending nipples $17^a$ and $19^a$ are connected hot and cold water supply pipes $23^a$ and $24^a$, respectively. An upstanding intermediate tubular extension 58 also projects through an opening $15^a$ in the sink flange $11^a$ and has connected thereto a swing spout $30^a$, while directly beneath the extension 58 and depending from the manifold 51 is a nipple $18^a$ to which is connected the hose $26^a$ of a spray nozzle.

Like the construction shown in Figures 1, 2, and 3, this form of the invention has the manifold $21^a$ provided with internally threaded nipples $32^a$ and $33^a$ communicating with the mixing chamber and receiving therein couplings $34^a$ and $35^a$ on the upper ends of pliable copper pipes $36^a$ and $37^a$. As the construction whereby the pipes $36^a$ and $37^a$ are connected to foot-operated valves which in turn are connected to the supply pipes $23^a$ and $24^a$ is the same as that previously illustrated and described, this portion of the construction has been omitted from Figure 4. The operation of this form of invention is identical to that previously described.

In Figure 5, there is shown still another form of the invention which is similar to that shown in Figure 4 except for the fact that the housings and seats of the foot-operated valves and the water passages leading to said valves and from said valves to the mixing chamber are constructed as parts of the same casting as that which includes the mixing manifold, upstanding tubular projections, and depending nipples. Because of the similarity of certain parts, the description of this form of the invention will be directed to structural differences only.

Extending downwardly from and communicating with the interior of the manifold $21^b$ are four passageways 60, 61, 62, and 63 at locations substantially the same as that of the depending nipples $17^a$, $32^a$, $33^a$, and $19^a$, respectively, shown in Figure 4. The passageways 60 and 61 are connected by a cross passageway 64 intermediate their ends, while the passageways 62 and 63 are likewise connected by a passageway 65. Connected to the casting at the lower ends of the passageways 60 and 63 are hot and cold water supply pipes $23^b$ and $24^b$, respectively, while threaded into the lower ends of the passageways 61 and 62 are foot-operated valve structures $38^b$ and $39^b$, respectively. In the passageways 61 and 62 above the locations where the cross passageways 64 and 65 communicate therewith are provided valve seats 66 and 67 which are engaged and disengaged by the valve structures $38^b$ and $39^b$.

On the depending ends of valve spindles $40^b$ and $41^b$ are secured pulley segments $42^b$ and $43^b$ with laterally extending arms $46^b$ and $47^b$ thereon to which are attached the end of a spring $48^b$. Secured to and entrained over the pulley segments are cables $44^b$ and $45^b$ for turning the spindles $40^b$ and $41^b$ to open the valves, while the spring $48^b$ closes the valves when tension on the cables is relieved. Because of the difference of arrangement of the valves in this form of the invention, it is necessary that additional pulleys 68 and 69 be used in extending the cables downwardly where they are operated by foot pedals (not shown).

When hand-operated valves $56^b$ and $57^b$ are opened and the foot-operated valves $38^b$ and $39^b$ are closed, water from the hot and cold water supply pipes flows through the passageways 60 and 63 and into the interior of the mixing manifold $21^b$ from where it is dispensed either through the swing spout $30^b$ or spray hose $26^b$. When the foot-operated valves $38^b$ and $39^b$ are opened, water from the supply pipes $23^b$ and $24^b$ by-passes the hand-operated valves $56^b$ and $57^b$ and flows through the cross passageways 64 and 65 into the passageways 61 and 62 and then into the interior of the mixing manifold $21^b$ from which it is dispensed either through the spout or spray hose.

By arranging the foot-operated valves vertically with the spindle ends extending downwardly, access to said valves which are located in rear of the sink can be gained for conveniently adjusting or removing the valve structures $38^b$ and $39^b$ to replace washers therein or for other repairs or replacement of parts thereto. Further, a construction of this character will require no more space than that now required between the rear wall of the sink and rear wall of the cabinet supporting the sink, which in some cases is rather restricted.

In view of the foregoing description taken in conjunction with the accompanying drawings, it is believed that a clear understanding of the construction, operation, and advantages of the device will be quite apparent to those skilled in this art. A more detailed description is accordingly deemed unnecessary.

It is to be understood, however, that even though there are herein shown and described preferred embodiments of the invention, various changes may be made without departing from the spirit and full intendment of the invention.

What is claimed is:

1. A water dispensing system comprising a mixing faucet having a one-piece body including a horizontally elongated mixing chamber, a pair of vertical passageways communicating with said mixing chamber adjacent each end of said chamber, a valve seat in each of said vertical passageways, and cross passageways communicating the pair of vertical passageways adjacent each end of said chamber, said cross pasageways being upstream of said valve seats; a pair of upstanding hand-operated valve structures mounted on said body, each hand-operated valve structure being located at the upper end of one vertical passageway of each pair of vertical passageways and being adapted to engage the valve seat therein; a pair of depending foot-operated valve structures carried by said body, each foot-operated valve being located at the lower end of the other vertical passageway of each pair of vertical passageways and being adapted to engage the valve seat therein; a hot water supply pipe connected to said body and communicating through one of said cross passageways with one pair of vertical passageways adjacent one end of said body; a cold water supply pipe also connected to said body and communicating through the other cross passageway with the other pair of vertical passageways adjacent the opposite end of said body; independent actuating means for each of said foot-operated valve structures; and a spout on said body and communicating with said mixing chamber.

2. A water dispensing system as defined in claim 1 wherein said foot-operated valve structures are closely associated and operated by rotary motion of the stems thereof in opposite directions to either open or close both valves, and wherein there are provided lever arms secured to the stems of said foot-operated valve structures that extend in the same general direction from said stems when said valves are closed, and a single contractile spiral spring connected at its opposite ends to the free ends of said lever arms for returning said foot-operated valve structures to closed positions after operation thereof.

References Cited in the file of this patent

UNITED STATES PATENTS

| | | |
|---|---|---|
| 1,176,784 | Speiden | Mar. 28, 1916 |
| 1,807,900 | Dougherty | June 2, 1931 |
| 1,848,456 | Beebe | Mar. 8, 1932 |
| 1,853,154 | Snyder | Apr. 12, 1932 |
| 2,264,876 | Hackley | Dec. 2, 1941 |